E. F. SULLIVAN.
TRACTOR CHAIN.
APPLICATION FILED FEB. 7, 1916.
1,308,308.
Patented July 1, 1919.
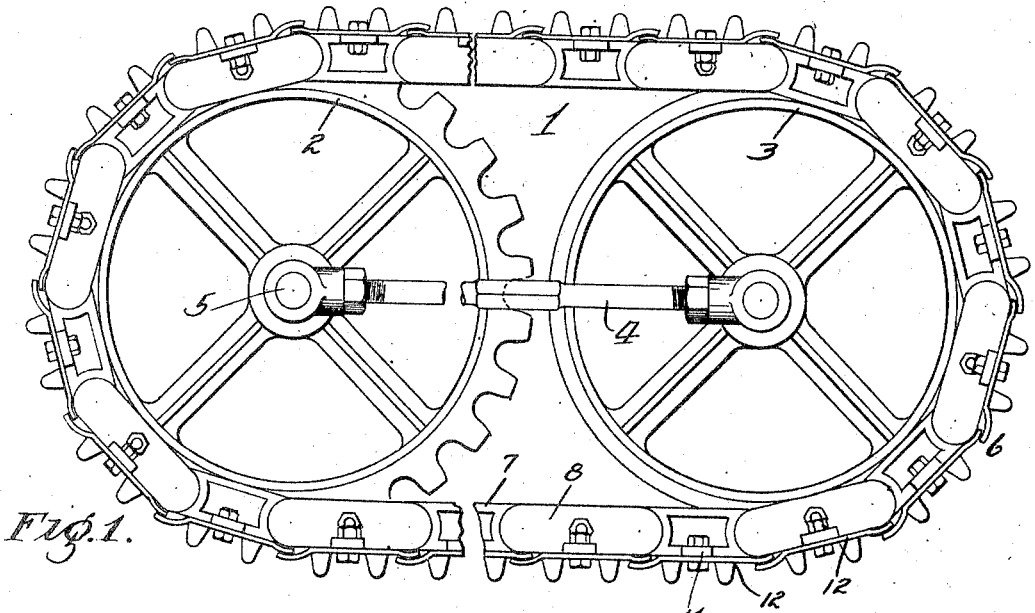
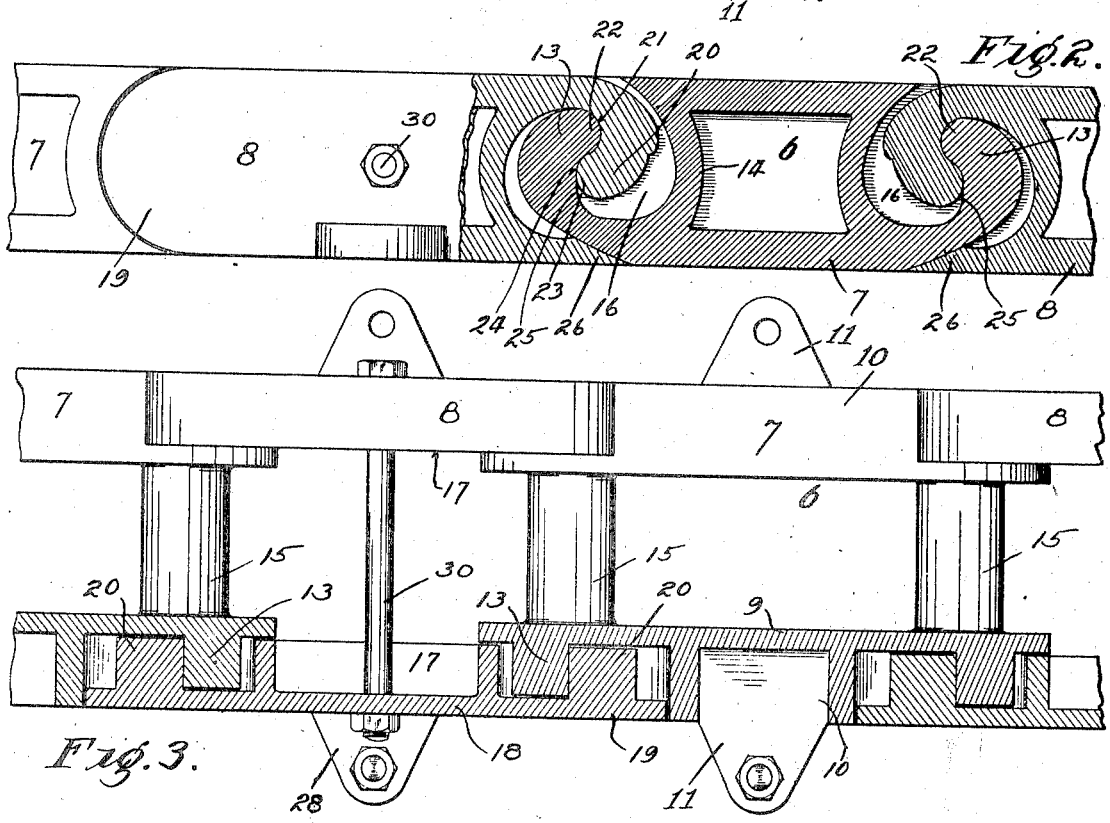
INVENTOR.
Edward F. Sullivan
BY
ATTORNEYS.

UNITED STATES PATENT OFFICE.

EDWARD F. SULLIVAN, OF OAKLAND, CALIFORNIA.

TRACTOR-CHAIN.

1,308,308.  Specification of Letters Patent.  Patented July 1, 1919.

Application filed February 7, 1916. Serial No. 76,806.

*To all whom it may concern:*

Be it known that I, EDWARD F. SULLIVAN, citizen of the United States, residing at Oakland, in the county of Alameda and State of California, have invented certain new and useful Improvements in Tractor-Chains, of which the following is a specification.

This invention relates to improvements in tractor belts and more particularly to the endless belt used on tractors of the track laying type. The principal object of my invention is to provide a belt of this character which comprises a series of intermeshing links adapted to encircle the supporting wheels, and which are held in longitudinal relation by means of coacting lugs formed on the adjacent side surfaces of such links.

Another object of my invention is to so construct the intermeshing lugs that a rolling contact is provided therebetween, thus to a great extent eliminating the wear which takes place between the various links in those which employ a pin or sleeve type of construction.

Another object of my invention is to so construct the links that between the bottom points of the supporting wheels, the links form a truss which resists the upward pressure of the supporting ground, thereby providing a rigid bearing surface between the two wheels.

Still another object of the invention is to so construct the links that various meshing parts are protected from the entrance of dust and grit.

With these and other objects in view my invention consists in the novel form and construction of links herein described and more specifically pointed out in the appended claims.

Reference being had to the accompanying drawing forming a part of this specification, Figure 1 is a view in side elevation of one truck of a tractor showing the application of my improved links thereto.

Fig. 2 is an enlarged side elevation of several links, a portion thereof being in section to more fully disclose the construction of the links.

Fig. 3 is a view in plan of several links, one side thereof being in section to disclose the manner in which the several links are interlocked.

Referring to corresponding parts in the several views by the same numerals of reference, 1 denotes in general the truck of a traction engine of the track laying type, this truck comprising the driving wheel 2, the idler wheel 3, held in spaced relation to the former by means of a radius rod 4. The driving wheel 2 is keyed upon the shaft 5 and which latter receives its power by any preferred means, which it is not deemed necessary to here describe.

The tractor chain, denoted by 6, passes around half of the circumference of each of these wheels and extends tangentially between the same. This chain comprises links of two distinct forms, which I denote by 7 and 8. The link 7 comprises the side bars 9 having semicircular ends and flanges 10. The bottom flange 10 has laterally extending ears 11, by which the shoes 12 are attached to the links. The side bars 9 are joined by the integrally formed pins 15 on which act the sprocket teeth of sprocket 2. On the outer surface at each end of the link is formed the hook-shaped lugs 13 and an arc shaped rib 14, connecting the upper and lower flanges 10. The curve of this rib has its center in the axis of the sleeve 15 and there is thus formed a recess 16, which is also substantially hook-shaped.

The link 8 is formed of two independent side bars 17, each comprising the flat plate 18 having the semicircular end portions 19, which fit within the arcuate rib 14 of the adjacent links 7. These links have formed on their inner surfaces a lug 20 substantially hook shaped complementary to the lug 13. Lug 20 is provided with a recessed portion 21, which fits closely about the end 22 of lug 13, and the end 23 of lug 20 contacts with the curved portion of lug 13 at the point 24, which lies in the axis of the pin 15. From this point is provided a short straight surface 25, upon which the point 23 is adapted to roll when the links assume an angular relation one with the other.

The lower edge of link 17 is provided with the longitudinally extending lug 26, which lug is adapted to contact with the under surface of lug 13 when the several links are joined in a horizontal position. Each of the link bars 17 is provided on the outside face with laterally extending ears 28 by which these links are attached to the shoes 12. In assembling, the link bars 17 are placed over the outside of link 7 with the lugs 20 entering the recesses 16 of the latter links. They are held in this position by means of a bolt 30 as well as by the fact that the links are bolted onto the shoes 12. The teeth of sprocket 2 contact with the pins 15 so that when the wheel is driven it tends to roll upon the pins of the lower links and as the links are bent to pass around the wheel, and curved end 23 rolls on the flat surface 25 thereby to considerable extent eliminating the wear due to friction between these parts.

It will be noted that when the chain is horizontal the lugs 26 contact with the underside of lugs 13 and the hook shaped ends of the lugs 13 and 20 are in close contact, therefore the links between the two wheels are prevented from being bent upwardly, forming a rigid truss between the tangent points of the wheels. By this means the use of intermediate supporting wheels is rendered unnecessary except on very long lengths of chain, securing by this construction a large supporting surface without the use of complex supporting means.

While I have shown and described the preferred embodiment of my invention it will be understood that changes may be made in minor detail and design without departing from the scope of the claims.

The extremity of the rib 14 of each link 7 extends considerably over the lug 20 of the adjacent link and confines said lug and the lug 26 confines the lug 13, thus protecting the coacting lugs and preventing dust, etc., entering therebetween, and wearing the same.

What I claim and wish to cover by Letters Patent is:—

1. An endless tractor belt comprising a plurality of pairs of links, one link of each pair comprising side bars and a connecting cross bar, hook-shaped lugs formed on the outer surfaces of said side bars, the other link of said pair comprising separate side bars, hook-shaped lugs formed on the inner faces of said separate side bars adapted to coact with said first-mentioned lugs to hold said links in longitudinal relation, and lips formed on the bottom of one of said pairs of links adapted to abut against the adjacent link when the links are in horizontal relation.

2. An endless traction chain comprising a plurality of pairs of links, coacting intermeshing lugs formed on said pairs of links to form a rolling contact therebetween, lips formed on one of said pairs, and abutments formed in the other of said pairs of links to prevent bending of said chain in one direction.

3. An endless traction chain comprising a plurality of links, hook-shaped lugs formed on each link adapted to intermesh with the lugs of the adjacent link, said intermeshing lugs having a rolling contact with each other, and abutments formed on adjacent links to prevent bending of said chain in one direction.

4. A traction chain including a plurality of links, each formed of a pair of side members, pins securing the side members of certain links together, laterally extending lugs on said members, laterally extending lugs on the members of the other links, means for detachably securing together the side members of each of the other links for maintaining the lugs of the different links in pivotal engagement with each other.

5. A traction chain including a plurality of links, outwardly extending lateral lugs on certain of said links, inwardly extending lateral lugs on the other links, means for maintaining the lugs of the different links in pivotal engagement with each other, and means maintaining the links of the chain rigid in straight relation between sprockets.

6. A traction chain including a plurality of links, each of said links formed of a pair of side members, pins securing the side members of certain links together, outwardly extending lateral lugs on said members, inwardly extending lateral lugs on the members of the other links, means for detachably securing together the side members of each of said other links for maintaining the lugs of the different links in pivotal engagement with each other.

In testimony whereof I affix my signature.

EDWARD F. SULLIVAN.